United States Patent [19]

Chang et al.

[11] 4,297,448

[45] Oct. 27, 1981

[54] COATING COMPOSITION OF AMINOPLAST, HYDROXY POLYMERS AND VINYLIC MONOMERS

[75] Inventors: Yun-Feng Chang, Plymouth; Henk V. Oene, Detroit; Elaine C. Beckwith, Riverview, all of Mich.

[73] Assignee: Ford Motor Company, Dearborn, Mich.

[21] Appl. No.: 85,570

[22] Filed: Oct. 17, 1979

[51] Int. Cl.$^3$ .................... C08L 71/02; C08L 29/00; C08L 33/20; C08L 51/06
[52] U.S. Cl. .................... 525/162; 260/30.4 R; 260/31.2 R; 260/32.8 R; 260/33.2 R; 260/33.6 R; 428/457; 525/154; 525/157; 525/163; 427/409
[58] Field of Search ............ 260/30.4 R, 30.4 EP, 260/30.4 N, 31.2 R, 31.2 N, 31.2 XA, 32.8 N, 32.8 EP, 32.8 R, 33.2 R, 33.2 EP, 33.6 EP, 33.6 UA, 33.6 R; 525/107, 154, 157, 162, 163

[56] References Cited

U.S. PATENT DOCUMENTS

| | | |
|---|---|---|
| 3,317,635 | 5/1976 | Osmond et al. |
| 3,514,500 | 5/1970 | Osmond et al. |
| 3,544,489 | 12/1970 | Dowbenko ............... 525/155 X |
| 3,607,821 | 9/1971 | Clarke et al. |
| 3,814,720 | 5/1974 | Maker et al. |
| 3,814,721 | 5/1974 | Maker et al. |
| 3,856,883 | 12/1974 | Dickie ................... 525/155 X |
| 3,862,071 | 1/1975 | DiCarlo ................. 525/155 X |
| 3,953,644 | 4/1976 | Camelon ................. 428/220 |
| 3,960,979 | 6/1976 | Khanna |
| 3,966,667 | 6/1976 | Sullivan et al. |
| 4,018,848 | 4/1977 | Khanna |
| 4,147,688 | 4/1979 | Makhlouf et al. |
| 4,169,825 | 10/1979 | Yapp ..................... 260/31.6 |

FOREIGN PATENT DOCUMENTS

| | | | |
|---|---|---|---|
| 806906 | 4/1970 | South Africa .......... | 260/30.4 R |
| 1223343 | 2/1971 | United Kingdom ...... | 260/30.4 R |

OTHER PUBLICATIONS

R. Dowbenko & Hart, Nonaqueous Dispersions as Vehicle for Polymer Coatings, Ind. Eng. Prod. Res. Devel., vol. 12, No. 1, 1973.

Primary Examiner—C. A. Henderson
Attorney, Agent, or Firm—Roger L. May; Olin B. Johnson

[57] ABSTRACT

A thermosetting coating composition which may have nonvolatile solids content as high as 60% or greater and which may be employed as an automotive topcoat. The composition, exclusive of pigments, solvent, reactive and non-reactive diluents and other non-reactive components, consists essentially of:

(A) A binder composition consisting essentially of:
  (1) Between about 30 and about 75 weight percent of one or more low viscosity resins selected from hydroxy functional acrylic polymers, hydroxy functional polyethers and hydroxy functional polyesters, each of which (i) is substantially soluble in the solvent of the composition and (ii) has a number average molecular weight of between about 1000 and about 2500; and
  (2) Between about 70 and about 25 weight percent of one or more crosslinked dispersion polymers each of which is substantially insoluble in the solvent of the composition; and
(B) An aminoplast crosslinking agent in an amount of between about 5 and about 40 parts per 100 parts of said binder composition. The crosslinked dispersion polymer is prepared by free radical polymerization of 0.5 to 3.5 weight percent of di-,tri- or tetravinyl monomers and 99.5 to 96.5 weight percent of at least one other copolymerizable monoethylenically unsaturated monomer, in the presence of (i) hydrocarbon dispersing liquid which is a solvent for the polymerizable monomer, but a non-solvent for the resulting crosslinked polymer, and (ii) polymeric dispersion stabilizer which is solvated by said dispersing liquid and associated with said crosslinked polymer so as to maintain a separation between particles thereof, thereby inhibiting coagulation of said particles, wherein polymerization is carried out at elevated temperature such that the dispersion polymer first forms and then is crosslinked.

15 Claims, No Drawings

COATING COMPOSITION OF AMINOPLAST, HYDROXY POLYMERS AND VINYLIC MONOMERS

BACKGROUND OF THE INVENTION

This invention relates to thermosetting coating compositions. More particularly, the invention relates to polymeric, high solids, thermosetting coating compositions adapted to provide an automotive top coat demonstrating hardness, high gloss, outstanding durability and excellent resistance to solvents and water. Still more particularly, the invention relates to a high solids, thermosetting coating composition which is adapted to be used as an automotive top coat and which is particularly adapted to be used as an automotive top coat wherein the top coat includes metallic flake as a pigment.

Because of increasingly strict solvent emissions regulations and the scarcity and expense of organic solvents in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive top coats, particularly when the top coat is to include metallic flake as a pigment.

To obtain reasonable application properties, prior art high solids coatings have generally been prepared from low viscosity resins. These low viscosity resins are either low molecular weight polymers or monomeric materials. All contain high functionalities. Upon baking or drying, they form a crosslinked network. Due to the low viscosity, however, these high solids coatings generally have a tendency to sag during application or baking. If the high solids coatings contain metallic pigments, such as aluminum flakes, aluminum reorientations such as mottling and reverse flop become major problems. This aluminum reorientation is not a problem in low solids coatings since high viscosity resins can be used. These high viscosity resins retard aluminum flake reorientation.

Because of the apparent necessity of using low viscosity resins, prior art compositions have not employed resins with high molecular weights or crosslinked structures as the principle binder polymer in high solids coatings.

Recently non-aqueous dispersion resin technology has been widely used in the automotive industry. These compositions are appealing due to their high molecular weight and fast solvent release. These non-aqueous dispersion resins or NAD's, as they are commonly called, however, are not used as the predominant film forming polymer and resultant compositions have relatively low solids content. NAD resins are generally prepared in inert solvents and they tend to be dissolved or swollen in active solvents, thus resulting in increased viscosity. Crosslinked dispersion resins have been found to have a more stable viscosity in active solvents.

Patents exemplifying prior art high solids coating compositions are: U.S. Pat. Nos. 3,960,979 and 4,018,848.

Patents exemplifying NAD-based coating compositions are: U.S. Pat. Nos. 3,317,635; 3,514,500; 3,607,821; 3,814,721; 3,966,667; and 4,147,688.

BRIEF DESCRIPTION OF THE INVENTION

The coating compositions of this invention combine desired properties of low application viscosity and high solids content, as well as rapid cure, to overcome deficiencies of previously proposed high solids materials and NAD-based compositions. The compositions of the invention are adapted to be made with high solids content, thus making them particularly well adapted for automotive top coats and still more particularly adapted for automotive top coats including metallic flake as pigment.

While the thermosetting compositions of the invention may be prepared with lower solids content, it is possible to prepare compositions according to the invention with solids content of 60 percent by weight or more. The thermosetting compositions of the invention, exclusive of pigments, solvents, reactive and non-reactive diluents and other non-reactive components, comprise an aminoplast crosslinking agent and a binder component including functionality which crosslinks during cure of the composition with amine functionality of the crosslinking agent.

Generally, the binder component comprises (A) between about 30 and 75 weight percent, preferably between about 40 and 60 weight percent, of one or more low viscosity resins; and (B) between about 25 and 70, preferably between about 30 and 50, weight percent of one or more crosslinked dispersion polymers. The low viscosity resins are substantially soluble in the solvent(s) of the composition and have a number average molecular weight of between about 500 and 3500. Each of these low viscosity resins also bears functionality capable of reacting with the crosslinking agent. The crosslinked dispersion polymer(s) are substantially insoluble in the solvent of the composition. The dispersion polymer(s) are prepared by free-radical polymerization of unsaturated monomers comprising about 0.5–3.5 weight percent of di-, tri-, or tetravinyl monomers and about 99.5–96.5 weight percent of at least one other copolymerizable monoethylenically unsaturated monomer. Polymerization is carried out in the presence of a hydrocarbon dispersing liquid which is a solvent for the polymerizable monomers, but a non-solvent for the resultant crosslinked polymer. Polymerization is also carried out in the presence of a dispersion stabilizer at an elevated temperature such that the dispersion polymer first forms and then internally crosslinks.

The aminoplast crosslinking agent of the composition may be employed in varied amounts depending upon the amount of crosslinking functionality on the resins in the binder component. Generally, however, the crosslinking agent will be included in amounts ranging from about 5 to about 30 parts per 100 parts by weight of the binder component.

In addition to the above components, compositions of the invention also may include additives such as catalysts, anti-oxidants, UV absorbers, flow control and wetting agents, anti-static agents, pigments, plasticizers, solvents, etc.

Compositions of the invention will be more fully understood from the following detailed description of the invention.

DETAILED DESCRIPTION OF THE INVENTION

As noted above, the coating compositions of the invention employ, in combination, a low viscosity resin and a crosslinked dispersion resin, with both resins being present as principal film-forming binders in the binder component. Thus, the compositions differ from conventional high solids coatings by including crosslinked dispersion resins. The nonflow characteristics of crosslinked dispersion resins eliminate sagging tendencies and retard metallic flake reorientation.

Compositions of the invention also differ from conventional NAD coatings by including low molecular weight resins as a principal film-former and employing a dispersion resin having a crosslinked structure. As a result of this crosslinked structure, compositions of the invention are not sensitive to solvent environment, thus allowing high solids formulation. As noted above, exclusive of optional components such as pigments, catalysts, UV absorbers, flow control additives, diluents, etc., compositions of the invention comprise a binder component and an amino crosslinking agent. The binder component comprises the aforementioned low viscosity resins and the crosslinked dispersion polymer component.

Low Viscosity Resins

Low viscosity resins used in the binder component are generally low molecular weight polymers with a high ratio of functionality. Upon reacting with aminoplast crosslinking agents, they form a crosslinked network to yield a film of good physical properties. These low viscosity resins are employed in amounts ranging from about 30 to about 75 percent by weight of the total binder component. Preferably, the low viscosity resins are used in amounts ranging from about 40 to about 60 weight percent. A suitable number average molecular weight for these resins ranges from about 500 to about 3500, more preferably, from about 1000 to about 2500. The low viscosity resins also bear functionality capable of reacting with the amino crosslinking agent. Among the crosslinking functionalities which can be employed are hydroxyl and carboxyl functionalities. Particularly preferred low viscosity resins are low molecular weight acrylic polymers bearing crosslinking functionality, hydroxy terminated polyethers and hydroxy terminated polyesters.

Preferred low molecular weight acrylic polymers generally contain hydroxyl functionality in the range of about 10 to about 40 percent by weight of the monomers employed to make the acrylic polymer. They also may include up to about 10 percent by weight of carboxyl functionality. The list of suitable hydroxyl functional monomers for preparation of these acrylic polymers is very long and will be apparent to those skilled in the art. The suitable monomers include, but are not limited to, the following esters of acrylic or methacrylic acid and aliphatic alcohols: 2-hydroxyethylacrylate; 3-chloro-2-hydroxypropyl acrylate; 2-hydroxy-1-methylethylacrylate; 2-hydroxypropylacrylate; 3-hydroxypropyl acrylate; 2,3 dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethylene glycol acrylate; 7-hydroxyheptyl methacrylate; 3-chloro-2-hydroxypropylmethacrylate; 2-hydroxylmethylethylacrylate; 2-hydroxypropylmethacrylate; 3-hydroxypropyl methacrylate; 2,3-dihydroxypropymethacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3 dimethyl-3-hydroxybutyl methacrylate; 5,6 dihydroxyhexyl methacrylate; and 7-hydroxyheptyl methacrylate. Preferred hydroxy functional monomers are 2-hydroxyethyl acrylate, 2-hydroxy ethyl methylacrylate, hydroxypropyl acrylate and hydroxypropyl methacrylate.

Preferred carboxyl functional monomers for use in the acrylic polymers are acrylic and methacrylic acids.

The remainder of monomers in the acrylic polymers may be chosen from other esters of acrylic and methacrylic acids. Representative of these esters are methyl acrylate; ethylacrylate; butyl acrylate; 2-ethylhexyl acrylate, hexyl acrylate, cyclohexyl acrylate, methyl methacrylate, ethyl methacrylate, isopropyl methacrylate, butyl methacrylate, hexyl methacrylate, lauryl methacrylate and stearyl methacrylate. These low molecular weight acrylic polymers are generally prepared by free radical polymerization in the presence of organic solvents. This procedure is well known to those skilled in the art.

Hydroxy terminated polyethers useful as low viscosity resins in the binder component of the invention have the general structure

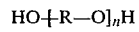

wherein n is between 5 and 50 and R is selected from the group consisting of (1) alkyl groups containing 2 to 12 carbon atoms, (2) cycloalkyl groups containing up to 12 carbon atoms, and (3) aromatic groups. The preferred hydroxy terminated ethers may be prepared in accordance with well known procedures. One such procedure involves reaction of an alkylene oxide or substituted alkylene oxide with a polyol, preferably a saturated, aliphatic or aromatic polyol. Polyols which react with the alkylene oxides or substituted alkylene oxides to form hydroxy terminated polyethers may be selected from aliphatic polyols, aromatic polyols and alicyclic polyols, with saturated aliphatic and aromatic polyols being preferred. Representative of the many polyols for use in preparing the hydroxy terminated polyethers useful in compositions of the invention are: ethylene glycol; propylene glycol; diethylene glycol; glycerol; trimethylol propane; trimethylolethane; 1,2,6-hexane triol; 1,1,3-tris (4-hydroxyphenyl) propane; pentaerythritol; sorbitol; manitol; dulcitol; diglycerol, etc.

Either alkylene oxides or substituted alkylene oxides may be reacted with the above described polyols to form a hydroxy terminated polyether. Among the many suitable oxides known in the art are: ethylene oxide; propylene oxide; butylene oxide; pentene oxide; styrene oxide; cyclohexane oxide; 1,4-epoxy cyclohexane oxide; etc.

Exact reaction conditions necessary for forming hydroxy terminated polyethers are well known to those skilled in the art. For a more detailed discussion of suitable polyethers and preparations therefor, attention is directed to *Polyurethanes, Chemistry and Technology*, Volume 1, Saunders and Frisch, Inter-Science Publishers, New York, 1962.

Typical hydroxy terminated polyesters useful in the binder component of the invention are low viscosity in nature. In other words, they have a low molecular weight with increased hydroxyl functionality that achieves high crosslinked densities with crosslinking agents, thus giving satisfactory film properties. Hydroxy terminated polyesters are normally processed to a low acid number in the range of 3 or less and have a hydroxyl value of 125 or greater. Two techniques for processing these resins are commonly used. One is a fusion process and the other is a solvent process. In both processes, glycol or mixed glycols and dicarboxylic acids or mixed dicarboxylic acids are charged into a reactor and then heated with stirring to remove water. The reaction is forced to completion by heat and reduced pressure until the acidity and water content are low and the hydroxyl number is in the desired range. Catalysts such as acids (e.g., p-toluenesulfonic acid) or metal oxides (e.g., lead oxide, dibutyl tin oxide) may be used to shorten reaction time. Polyols used for preparation of hydroxy terminated polyesters may be selected from ethylene glycol, propylene glycol, diethylene glycol, glycerol, trimethylol propane, trimethylol ethane, 1,2,6, hexanetriol, 1,1,3-tri(4-hydroxyphenyl) propane, pentaerythritol. Representative of carboxylic acids which may be employed are terephthalic acid; adipic acid, azelaic acid, o-phthalic acid, 1,2 cyclohexane dicarboxylic acid, 1,4 cyclohexane dicarboxylic acid, etc. Carboxylic acid anhydrides, which may be anhydrides of the above enumerated types of carboxylic acids, may also be employed. For example, suitable anhydrides may include succinic anhydride, hexa-hydrophthalic anhydride, phthalic anhydride, trimellitic anhydride, pyromellitic dianhydride, chlorendic anhydride, etc.

Crosslinked Dispersion Polymers

The crosslinked dispersion polymers are the other principal binder polymer of the compositions of the invention. These crosslinked dispersion polymers are employed in amounts ranging from about 20 to about 70 weight percent, preferably from about 30 to about 50 weight percent of the total binder component of the compositions. The crosslinked dispersion polymers are substantially insoluble in the solvents or solvent mix of the composition. The polymers are formed by free radical polymerization of about 0.5 to about 3.5 weight percent, preferably about one to about 2.5 weight percent, of di-, tri-, or tetravinyl monomers and 99.5 to 96.5 weight percent, preferably 99 to 97.5 weight percent, of at least one other copolymerizable monoethylenically unsaturated monomer. Polymerization is carried out in the presence of a hydrocarbon dispersing liquid which is a solvent for the polymerizable monomer, but a non-solvent for the resultant crosslinked polymer. Polymerization is also carried out in the presence of a polymeric dispersion stabilizer at elevated temperatures such that the dispersion polymer first forms and then is crosslinked.

The dispersion polymers are self-crosslinking as a result of incorporation of the di, tri, or tetravinyl monomers. The amount of the self-crosslinking monomers must be controlled carefully within the ranges set forth above. Too low a concentration may yield a polymer without a crosslinked structure, while too high a concentration results in coagulation of the dispersion resin. Suitable di, tri, or tetravinyl monomers are di, tri- or tetraacrylates. These include, but are not limited to, melamine triacrylate, 1,6 hexane-diol diacrylate, ethylene glycol diacrylate; tetraethylene glycol diacrylate; pentaerythritol triacrylate; 1,1,1-trimethylolpropane diacrylate, and 2-butene-1,4 diacrylate.

The crosslinked dispersion polymers may also contain additional functionality capable of further reaction with the aminoplast crosslinking agent of the composition. When such additional functionality is included, the crosslinked network of the composition is enhanced by reaction between the functionality and the crosslinking agent. Among suitable functionalities which may be included on the dispersion polymers are hydroxyl and glycidyl functionalities. Generally such functionality may be included in the range from about 5 to about 35 weight percent of the polymer. Suitable hydroxy functional monomers are those which are disclosed hereinbefore for use in preparing low viscosity acrylic resins. Preferred hydroxyl functional monomers for use in the crosslinked dispersion polymers are 2-hydroxyethyl acrylate; 2-hydroxyethyl methacrylate, hydroxypropyl acrylate and hydroxypropyl methacrylate.

The remainder of monomers used in forming the crosslinked dispersion polymers are other monoethylenically unsaturated monomers. These are preferably alpha-beta, olefinically unsaturated monomers. Among the many alpha-beta, olefinically unsaturated monomers which may be employed are esters of both acrylic and methacrylic acids as well as vinyl hydrocarbons. Among the esters of acrylic and methacrylic acids are methyl acrylate, ethyl acrylate, butyl acrylate, 2-ethylhexyl acrylate, 2-ethylhexylmethacrylate, hexyl acrylate, cyclohexyl acrylate, methyl methacrylate, ethyl methacrylate, isopropyl methacrylate, butyl methacrylate, hexyl methacrylate, lauryl methacrylate and stearyl methacrylate. Representative of hydrocarbons which may be employed are styrene, alpha methyl styrene, vinyl toluene, acrylonitrile, methacrylonitrile and vinyl acetate.

The method of preparation of dispersed polymers has been the subject of extensive study and is well known to those skilled in the art.

In general, preparation of dispersion polymers is carried out by free radical polymerization in an inert solvent in the presence of a stabilizer. The function of the stabilizer is to keep the dispersion polymers from coagulating during preparation and storage. All such stabilizers are solvated by the dispersing liquid in which the polymerization is carried out and are associated with the crosslinked polymer so as to maintain a separation between particles thereof, thereby inhibiting coagulation of said particles. Various types of such stabilizers have been developed and are known to those skilled in the art. Included among such well known stabilizers are those which contain at least two segments, one of which is solvated by the dispersing liquid and a second of which is of different polarity than said first segment and is relatively insoluble in said dispersing liquid. Numerous stabilizers falling within this general classification are disclosed in U.S. Pat. No. 4,147,688. Suitable stabilizers are also discussed further in a review by Rostyslav Dowbenko and Donald D. Hart in "Ind. Eng. Chem. Prod. Res. Develop.", Vol. 12, No. 1, 1973. These disclosures with respect to stabilizers are incorporated herein by reference.

Highly butylated melamine formaldehyde resins are quite commonly used as stabilizers in the preparation of dispersion polymers. The precise mechanism by which such butylated melamines become associated with the crosslinked polymers is not clear.

Crosslinking Agents

A third essential component of the coating compositions of the invention is an aminoplast resin crosslinking agent. Amino resin crosslinking agents suitable for crosslinking hydroxy functional bearing materials are well known in the art. Typically, these crosslinking materials are amine aldehyde compounds comprising reaction products of melamine or urea with formaldehyde or various alcohols containing up to and including four carbon atoms. Preferably, the amino crosslinking agents used are condensation products of formaldehyde with melamine, substituted melamine, urea, benzoguanamine or substituted benzoguanamine. Preferred members of this class are methylated melamine formaldehyde resins such as hexamethoxymethylmelamine. These liquid crosslinking agents have substantially 100 percent non-volatile content as measured by the foil method at 45° C. for 45 minutes. It will be appreciated by those skilled in the art that many aminoplast crosslinking agents not exemplified herein would be suitable for use in compositions of the invention. As mentioned hereinbefore, while varying amounts of crosslinking agents may be employed depending upon the amount of crosslinking functionality in the binder component, generally the amount of crosslinking agent varies between about 5 and about 40 parts per 100 parts by weight of the binder component.

Other Materials

In addition to the above discussed components, other materials may be included in coating compositions of the invention. These include materials such as catalysts, antioxidants, UV-absorbers, solvents, surface modifiers and wetting agents as well as pigments. Typical solvents useful in coating compositions of the invention facilitate spray application at high solids content and include organic solvents such as toluene, xylene, methylethyl ketone, acetone, 2-ethoxy-1-ethanol, 2-butoxy-1 ethanol, diacetone alcohol, tetrahydrofuran, ethylacetate, or mixtures thereof.

Catalysts for the curing of the resins described herein are not normally required to obtain satisfactory film properties. If desired, however, for purposes of lowering the film baking temperature and/or time or of further improving cured film properties, strong acid catalysts can be employed in an amount not in excess of 0.5 percent by weight of total solvents. The most commonly used catalysts are p-toluenesulfonic acid and esters of phosphoric acid.

A reactive diluent may be included in the coating composition to lower the viscosity during application. These are generally used in amounts not exceeding 10 percent by weight of total solids. High boiling polyols such as 2-ethyl-1,3 hexanediol and 2-methyl-2,4pentanediol and 2-methyl-2,4 pentanediol are preferred.

Surface modifiers or wetting agents are common additives for compositions such as disclosed and claimed herein. The exact mode of operation of these surface modifiers is not known, but it is thought that their presence contributes to better adhesion of the coating composition to the surface being coated and helps formation of thin coatings on surfaces, particularly metal surfaces. The choice of surface modifier or wetting agent is dependent on the type of surface to be coated.

Compositions of the invention also may include pigments. As noted above, the compositions of the invention are particularly useful when a coating composition includes metallic flake as a pigment. Rapid set in curing of the composition eliminates problems associated with redistribution of metallic flake in the composition. The amount of pigment in high solids coating compositions may vary, but preferably is between about 3 and about 45 weight percent based on the total weight of the paint composition. If the pigment is metallic flake, the amount generally ranges from about 1 to about 7 weight percent.

The invention will be further understood by referring to the following detailed examples. It should be understood that specific examples are presented by way of illustration and not by way of limitation. Unless otherwise specified, all references to "parts" are intended to mean parts by weight.

EXAMPLE 1

A. Preparation of Crosslinked Dispersion Polymer

An alkylated melamine formaldehyde resin is used as stabilizer for the preparation of crosslinked dispersion polymers. It is prepared by mixing 540 g of melamine, 658 g of butanol, 150 g of xylene, 0.9 g phthalic anhydride and 1670 g of a solution containing 40 weight percent formaldehyde, 51 weight percent butanol and 9 weight percent water. The mixture is heated to refluxing temperature for 5-6 hours until a mineral spirit tolerance of 1700 (ASTMD1198-55) is achieved. All water is removed during refluxing. Butanol then is removed under vacuum to provide a solids content of 60 weight percent.

One hundred forty three (143) g of the alkylated melamine formaldehyde resin is mixed with 177 g of aliphatic naphtha having a distillation range of 99°–135° C. in a 3-necked one liter flask equipped with condenser, thermometer and stirrer. The contents are heated to refluxing under constant, high speed stirring. While refluxing and stirring are maintained, a mixture of

| methylmethacrylate (MMA) | 98 grams |
| butylmethacrylate (BMA) | 30 grams |
| acrylonitrile (AN) | 40 grams |
| hydroxypropylmethacrylate (HPMA) | 30 grams |
| melamine triacrylate | 2 grams |
| t-butyl peroctoate | 2 grams | is added dropwise over a period of about 3 hours. Refluxing and stirring are continued for another 3 hours. The resulting product is a stable milky white dispersion having a solids content of about 55 weight percent. The viscosity is 45 seconds in number 4 Ford cup at 25° C. The dispersion resin cannot be dissolved in active solvents such as toluene, xylene, acetone, etc.

B. Preparation of Low Molecular Weight Acrylic Polymer

Into a 3-necked, one liter flask equipped with condenser, thermometer and stirrer, 200 g of methyl amyl ketone is added and heated to reflux. Then a mixture of

| BMA | 84 grams |
| MMA | 45 grams |
| 2-ethylhexylacrylate (2-EHA) | 105 grams |
| HPMA | 60 grams |
| Acrylic Acid (AA) | 6 grams |
| t-butyl peroctoate | 12 grams | is added dropwise over a period of 3 hours. Refluxing and stirring are continued for another 3 hours. The resulting resin is a clear solution having a solids content of 60 percent by weight. The number average molecular weight is 2200.

C. Preparation of Coating Composition

A coating composition containing the following is prepared:

| | |
|---|---|
| Crosslinked Dispersion Polymer from A | 50 grams |
| Acrylic Polymer from B | 50 grams |
| Cymel 301 (hexamethoxymethyl melamine) | 15 grams |
| Phthalocyanine blue | 1 gram |
| Al paste | 3 grams |
| 2-Ethyl-1,3-hexanediol | 5 grams |
| P-toluenesulfonic acid | 0.1 gram |
| Methylamyl ketone | 5 grams |

This coating composition has a solids content of 63% by weight and a viscosity of 35 seconds with Ford cup number 4. The coating is sprayed on a steel panel and baked at 130° C. for 25 minutes. The coating obtained has good adhesion to steel and good resistance properties. No sagging or Al flake reorientation is observed.

EXAMPLE 2

A. Preparation of Crosslinked Dispersion Polymer

A crosslinked dispersion polymer is prepared as in Example 1A with the exception that the monomer mix consists of:

| | |
|---|---|
| MMA | 98 grams |
| BMA | 27 grams |
| AN | 40 grams |
| HPMA | 33.5 grams |
| 1,6-hexanedioldiacrylate | 1.5 grams |
| t-butylperoctoate | 2 grams |

The resulting polymer has a solids content of about 55% by weight and a viscosity of 40 seconds in a number 4 Ford cup.

B. Preparation of Low Molecular Weight Acrylic Polymer

The polymer is prepared as in Example 1B, except the following monomer mixture is used:

| | |
|---|---|
| BMA | 135 grams |
| MMA | 30 grams |
| 2-EHA | 90 grams |
| HPMA | 45 grams |
| t-butylperoctoate | 12 grams |

The resulting polymer has a $\overline{M}n$ of 2100.

C. Preparation of Coating Composition

A coating composition containing the following is prepared:

| | |
|---|---|
| Acrylic polymer from B | 75 grams |
| Crosslinked dispersion polymer from A | 35 grams |
| Cymel 301 | 25 grams |
| 2-ethyl-1,3 Hexanediol | 10 grams |
| TiO$_2$ | 40 grams |
| Toluene | 10 grams |

The composition has a solids content of 72% by weight and a viscosity of 40 seconds in number 4 Ford cup. The coating is applied on a steel panel and baked at 150° C. for 30 minutes. A durable, good solvent resistance film is obtained. No sagging or running is observed.

EXAMPLE 3

A coating composition is prepared in accordance with Example 2, with the exception that no pigment was used. No sagging or running is observed during application and baking. A tough, durable film is obtained.

EXAMPLE 4

A coating composition is prepared in accordance with Example 2, with the exception that a butylated melamine resin instead of Cymel 301 is used as crosslinking agent. A durable film with good solvent resistance is obtained. No sagging is observed.

EXAMPLE 5

A coating composition is prepared from the following:

| | |
|---|---|
| Crosslinked dispersion polymer from Example 2A | 28 grams |
| Acrylic polymer from Example 2B | 88 grams |
| Cymel 301 | 20 grams |
| Phthalocyanine green | 1 gram |
| Al paste | 4 grams |
| p-toluenesulfonic acid | 0.2 grams |

This composition has a solids content of 66% by weight. The coating is sprayed and baked at 130° C. for 25 minutes to yield a durable film with good metallic appearance.

EXAMPLE 6

A. Preparation of Crosslinked Dispersion Polymer

The polymer is prepared as in Example 1A with the exception that the following monomer mixture is used:

| | |
|---|---|
| MMA | 118 grams |
| BMA | 27 grams |
| AN | 40 grams |
| HPMA | 10 grams |
| Melamine triacrylate | 5 grams |
| t-butylperoctoate | 2 grams |

The resulting polymer is a stable, milky dispersion with a solids content of 55% by weight. The crosslinked dispersion polymer is not dissolved in active solvents.

B. Preparation of Low Molecular Weight Acrylic Polymer

The polymer is prepared as in 1A, except that the following monomer mixture is used:

| | |
|---|---|
| MMA | 50 grams |
| BMA | 115 grams |
| lauryl methacrylate | 80 grams |
| HPMA | 55 grams |
| Benzoyl peroxide | 12 grams |

The number average molecular weight of the resulting polymer is 2500.

C. Preparation of Coating Composition

A coating composition is formulated as in Example 1, with the exception that the crosslinked dispersion and acrylic polymers of 6A and 6B are used. A durable coating with good metallic appearance is obtained.

EXAMPLE 7

A. Crosslinked Dispersion Polymer

The polymer is prepared as in 6A.

B. Preparation of Hydroxy-Terminated Polyester

The hydroxy-terminated polyester is prepared using a one stage solvent reflux procedure. The following ingredients are charged to a reaction kettle equipped with agitator, thermometer, inert gas sparge and a heated partial condenser.

| Toluene | 40 grams |
|---|---|
| neopentyl glycol | 310 grams |
| Trimethylolpropane | 70 grams |
| Isophthalic acid | 400 grams |
| Adipic acid | 70 grams |
| Dibutyltin oxide | 1 gram |

The toluene is used as the reflux solvent to aid in the azeotropic removal of water. A minimum of three hours heat-up time is employed to reach a maximum cook temperature of 220° C. Dibutylin oxide is used as an esterification catalyst. The mixture is processed to an acid value of less than three and hydroxyl value of 120. Then it is vacuum stripped for one hour at the cook temperature to remove toluene and trace amounts of water. The temperature is reduced to 140° C. and the resin reduced to 90% nonvolatiles with exempt solvent. The molecular weight of the obtained hydroxy-terminated polyester is 1300.

C. Preparation of Coating Composition

A coating composition is prepared from the following components:

| Crosslinked Dispersion Polymer (6A) | 100 grams |
|---|---|
| Hydroxy-Terminated Polyester from Example 7B | 50 grams |
| Cymel 301 | 15 grams |
| P-toluenesulfonic acid | 0.2 grams |

The composition has a solids content of 70% by weight. A good film is obtained by baking at 130° C. for 25 minutes. No sagging or running is observed.

EXAMPLE 8

A coating composition is prepared as in Example 7 with the exception that it contains:

| Phthalocyanine blue | 1 gram |
|---|---|
| Al paste | 4 grams |

A coating with good metallic appearance is obtained.

EXAMPLE 9

A. Preparation of Crosslinked Dispersion Polymer

This polymer is prepared as in Example 1A, except the following monomer mixture is used:

| MMA | 80 grams |
|---|---|
| BMA | 27 grams |
| Styrene | 30 grams |

-continued

| AN | 30 grams |
|---|---|
| HPMA | 30 grams |
| Pentaerythritol triacrylate | 3 grams |
| t-butylperoctoate | 2 grams |

B. Preparation of Hydroxy-Terminated Polyester

The polyester is prepared as in Example 7B, except the following mixture is used:

| TMPG Glycol | 320 grams |
|---|---|
| Trimethylolpropane | 125 grams |
| Isophthalic acid | 250 grams |
| Adipic acid | 150 grams |
| Toluene | 40 grams |
| Dibutyltin oxide | 1 gram |

The resulting resin has a hydroxyl value of 125 and $\overline{M}n$ of 1500.

C. Preparation of Coating Composition

| Crosslinked Dispersion Polymer from Example 9A | 100 grams |
|---|---|
| Hydroxy-Terminated Polyester from Example 9B | 60 grams |
| Cymel 301 | 20 grams |
| TiO$_2$ | 70 grams |
| 2-ethyl-1,3 hexanediol | 5 grams |
| p-Toluenesulfonic acid | 0.2 grams |

The coating composition has a solids content of 80% by weight. Baked at 130° C. for 25 minutes, a film with good appearance (no sagging or running) is obtained.

EXAMPLE 10

A composition is prepared as in 9C with the exception that no TiO$_2$ is used. The clear coating exhibits good properties and good appearance.

EXAMPLE 11

A coating composition is prepared from the following:

| Crosslinked dispersion resin from Example 9A | 100 grams |
|---|---|
| Hydroxy-Terminated polyester from Example 9B | 60 grams |
| Acrylic polymer from Example 1B | 50 grams |
| Cymel 301 | 30 grams |
| Phthalocyanine blue | 2 grams |
| Al paste | 5 grams |
| 2-ethyl-1,3-hexanediol | 10 grams |

The coating composition has a solids content of 73% by weight. Baked at 150° C. for 30 minutes, a film with good metallic color is obtained.

EXAMPLE 12

A. A Crosslinked Dispersion Polymer Is Prepared As In Example 9A

B. Preparation of Hydroxy-Terminated Polyether

The hydroxy terminated polyether is prepared in the following manner. Into a steel vessel are placed 15.2 parts of 1,2-propylene glycol and anhydrous sodium hydroxide under a nitrogen atmosphere. The vessel is then pressurized to 75 psig with nitrogen and heated slowly to 125° C. The pressure is then released and 116 parts of propylene oxide introduced. The reaction is maintained at 125° C. under a pressure of 35 to 50 psig for 14 hours. The mixture is then cooled, the sodium hydroxide catalyst neutralized with sulfuric acid and the product filtered. The hydroxy terminated polyether and water is removed. The resultant resin has a molecular weight of 1100.

C. Preparation of Coating Composition

The composition is prepared from the following:

| | |
|---|---|
| Crosslinked Dispersion Polymer from Example 9A | 100 grams |
| Hydroxy-Terminated Polyether from 12B | 60 grams |
| Cymel 301 | 20 grams |
| P-toluenesulfonic acid | 0.2 grams |

This composition has a solids content of 75% by weight. Baked 150° C. for 35 minutes, a film with good appearance and resistance properties is obtained.

EXAMPLE 13

A. A Crosslinked Dispersion Polymer is Prepared as in Example 9A

B. Hydroxy-Terminated Polyether

A hydroxy-terminated polyether having a molecular weight of 2100 is prepared in the manner described in Example 12B, except that 12 g of tri-methylolethane is reacted with 174 g of propylene oxide.

C. Preparation of Coating Composition

The composition is prepared from the following:

| | |
|---|---|
| Crosslinked dispersion polymer | 100 grams |
| Acrylic polymer from Example 1B | 40 grams |
| Hydroxy-Terminated Polyether from Example 13B | 60 grams |
| Cymel 301 | 20 grams |
| TiO$_2$ | 80 grams |
| P-toluenesulfonic acid | 0.2 grams |

EXAMPLE 14

A hydroxy-terminated polyether of Mn=1600 is prepared by reacting 7.6 g of 1,2-propylene glycol with 144 g of 1,2-butylene glycol and a coating composition is formulated from the following:

| | |
|---|---|
| Crosslinked dispersion polymer from Example 6A | 110 grams |
| Hydroxy-terminated polyether prepared as above | 60 grams |
| Cymel 301 | 25 grams |
| Phthalocyanine green | 1.5 grams |
| Al paste | 5 grams |
| P-toluenesulfonic acid | 0.2 grams |

This composition has a solids content of 75% by weight. Baked at 150° C. for 25 minutes, a coating with good metallic color is obtained.

EXAMPLE 15

A hydroxy-terminated polyether of $\overline{M}n$=3200 is prepared by reacting 9.2 g of glycerol and 174 g of propylene oxide. A coating composition is prepared from the following:

| | |
|---|---|
| Crosslinked dispersion polymer from Example 6A | 100 grams |
| Hydroxy-terminated polyether prepared as above | 30 grams |
| Cymel 301 | 15 grams |
| Phthalocyanine green | 2 grams |
| Al paste | 5 grams |
| P-toluenesulfonic acid | 0.1 grams |

A good metallic coating is obtained from this composition (70% solids) by baking at 150° C. for 25 minutes.

EXAMPLE 16

A coating composition is prepared from the following:

| | |
|---|---|
| Crosslinked dispersion polymer from Example 1A | 50 grams |
| Hydroxy-terminated polyester from Example 7B | 45 grams |
| Hydroxy-terminated polyether from Example 15 | 20 grams |
| Cymel 301 | 20 grams |
| TiO$_2$ | 35 grams |

A coating with good appearance is obtained by baking at 150° C. for 40 minutes. The solids content of the composition is 83% by weight.

EXAMPLE 17

A coating composition is prepared from the following:

| | |
|---|---|
| Hydroxy-terminated polyether from Example 15 | 100 grams |
| Cymel 301 | 30 grams |
| TiO$_2$ | 50 grams |
| P-toluenesulfonic acid | 0.2 grams |
| Toluene | 15 grams |

This coating shows severe sagging and running during spraying and baking. No acceptable appearance can be obtained with this composition.

EXAMPLE 18

A composition is formulated from the following:

| | |
|---|---|
| Hydroxy-terminated polyester from Example 7B | 100 grams |
| Cymel 301 | 35 grams |
| Phthalocyanine blue | 2 grams |
| Al paste | 4 grams |
| P-toluenesulfonic acid | 0.2 grams |
| Toluene | 20 grams |

This coating exhibits severe Al flake reorientation (mottling and reverse flop). The appearance is not acceptable.

EXAMPLE 19

A composition is formulated from the following:

| | |
|---|---|
| Acrylic polymer from Example 1B | 100 grams |
| Cymel 301 | 35 grams |

| | | |
|---|---|---|
| Phthalocyanine blue | 2 | grams |
| Al paste | 4 | grams |
| P-toluenesulfonic acid | 0.2 | grams |
| Toluene | 20 | grams |

This coating exhibits severe Al flake reorientation (mottling and reverse flop). The film does not have a satisfactory appearance.

EXAMPLE 20

A. Preparation of Crosslinked Dispersion Polymer

The crosslinked dispersion polymer is also prepared by using an acrylic stabilizer. The acrylic stabilizer is prepared by first reacting 96 g. of dimer 12-hydroxystearic acid with 10 g. of glycidyl methacrylate in 70 g. of butyl acetate at 130° C. for 5 hours. Then 61 g. of the reaction product together with 33 g. of methyl methacrylate, 4.5 g. of glycidyl methacrylate, 0.5 g. of methacrylic acid and 1.5 g. of azobisisobutyronitrile are polymerized in a mixture solvent containing 29 g. of butyl acetate and 6 g. of xylene. The polymerization is carried out at 120° C. for 12 hours. This acrylic stabilizer contains 55% solids.

Into a reaction flask, a mixture of 2.5 g. of acrylic stabilizer, aliphatic naphtha having a distillation range of 90°–130° C., 0.2 g. butyl peroctoate, and 14 g. of the following monomer mixture is charged and heated to 90° C.

| | |
|---|---|
| MMA | 50% |
| BMA | 25% |
| HPMA | 23.5% |
| Melamine triacrylate | 1.5% |

While stirring and the temperature are maintained at 90° C., a mixture of 380 g. of monomers, 5 g. of acrylic stabilizer, 150 g. of aliphatic naphtha and 1 g. of t-butyl peroctoate is added dropwise over a period of 5 hours. After addition is completed, stirring and the temperature are continued for another 2 hours. The resulting product is a stable milky dispersion with a solids of 47%.

B. Preparation of Low Molecular Weight Acrylic Polymer

The polymer is prepared as in 1A, except that the following monomer mixture is used:

| | | |
|---|---|---|
| MMA | 80 | grams |
| BMA | 115 | grams |
| lauryl methacrylate | 50 | grams |
| HPMA | 55 | grams |
| Benzoyl peroxide | 12 | grams |

The number average molecular weight of the resulting polymer is 2500.

C. Preparation of Coating Composition

A coating composition is formulation as in Example 1, with the exception that the crosslinked dispersion and acrylic polymers of 20A and 20B are used. A durable coating with good metallic appearance is obtained.

In view of this disclosure, many modifications of this invention will be apparent to those skilled in the art. It is intended that all such modifications which fall within the true scope of this invention be included within the terms of the appended claims.

We claim:

1. A thermosetting coating composition comprising organic solvent, binder composition, and aminoplast crosslinking agent, wherein said binder composition comprises:
   (A) between about 30 and about 75 weight percent of one or more low viscosity resins, each of which (1) is substantially soluble in the solvent of the composition, (2) has a number average molecular weight of between about 500 and about 3500 and (3) is selected from the group consisting of hydroxy functional acrylic polymers, hydroxy functional polyethers and hydroxy functional polyesters and bears no additional functionality which would interfere with the crosslinking reaction between the hydroxy functionality of the resin and the crosslinking agent of the composition; and
   (B) between about 70 and about 25 weight percent of one or more crosslinked dispersion polymers, each of which is substantially insoluble in the solvent of the composition, said dispersion polymers being formed by free radical polymerization of 0.5 to 3.5 weight percent of di-, tri-, or tetravinyl monomers and 99.5 to 96.5 weight percent of at least one other copolymerizable monoethylenically unsaturated monomer, in the presence of a (i) hydrocarbon dispersing liquid which is a solvent for the polymerizable monomers, but a non-solvent for the resulting crosslinked polymer, and (ii) polymeric dispersion stabilizer which is solvated by said dispersing liquid and associated with said crosslinked polymer so as to maintain a separation between particles thereof, thereby inhibiting coagulation of said particles, wherein polymerization is carried out at elevated temperature such that the dispersion polymer first forms and then is crosslinked.

2. A composition in accordance with claim 1 wherein said polymeric dispersion stabilizer contains at least two segments, one of which is solvated by said dispersing liquid and a second of which is of different polarity than said first segment and is relatively insoluble in said dispersing liquid.

3. A composition in accordance with claim 1 wherein said polymeric dispersion stabilizer is a butylated melamine.

4. A composition in accordance with claim 1, wherein said aminoplast crosslinking agent is present in said composition in an amount ranging from about 5 to about 40 parts per 100 parts of said binder composition.

5. A composition in accordance with claim 1, wherein said low viscosity resin comprises an acrylic copolymer which has a glass transition temperature of between about −20° C. and about 45° C. and is formed from (i) 10–40 weight of hydroxy functional monoethylenically unsaturated monomers, (ii) 0–10 weight percent of carboxyl functional monoethylenically unsaturated monomers, and (iii) a remainder of monomers selected from esters of acrylic and methacrylic acid, and vinyl hydrocarbons.

6. A composition in accordance with claim 1, wherein said low viscosity resin comprises a hydroxy terminated polyether having the general structure

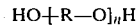

wherein n is between 5 and 50, and R is selected from the group consisting of alkyl groups containing 2 to 12 carbons, cycloalkyl groups containing up to 12 carbons, and aromatic groups.

7. A composition in accordance with claim 1 wherein said low viscosity resin comprises a hydroxy functional polyester having an acid number of not greater than 3 and a hydroxyl value of at least 125.

8. A composition in accordance with claim 1, wherein said di-, tri-, or tetravinyl monomers used to form said crosslinked dispersion polymer are employed in an amount ranging from about 1 to about 2.5 weight percent of the reactant monomers.

9. A composition in accordance with claim 1, wherein said di-, tri-, or tetravinyl monomers used to form said crosslinked dispersion polymer are di-, tri-, or tetraacrylates, and wherein said monomethylenically unsaturated monomers used to form said crosslinked dispersion polymer are alpha-beta olefinically unsaturated monomers.

10. A composition in accordance with claim 9 wherein all of said alpha-beta monoethylenically unsaturated monomers employed in forming said crosslinked dispersion polymer are monofunctional.

11. A composition in accordance with claim 9 wherein said alpha-beta monoethylenically unsaturated monomers include between about 5 and about 35 weight percent, based on the total weight of reactants used in forming the crosslinked dispersion polymer, of monomers bearing functionality capable of crosslinking with the crosslinking agent of the composition.

12. A composition in accordance with claim 11 wherein said functionality capable of crosslinking with said crosslinking agent of said composition is hydroxyl or glycidyl functionality.

13. A thermosetting coating composition which, exclusive of pigments, organic solvent, reactive and non-reactive diluents and other non-reactive components, consists essentially of:
   (A) A binder composition consisting essentially of
   (1) Between about 40 and about 60 weight percent of one or more low viscosity resins selected from the group consisting of hydroxy functional acrylic polymers, hydroxy functional polyethers and hydroxy functional polyesters, each of which (i) is substantially soluble in the organic solvent of the composition, (ii) has a number average molecular weight between about 1000 and about 2500 and (iii) bears no additional functionality which would interfere with the crosslinking reaction between the hydroxyl functionality of the resin and crosslinking agent (B); and
   (2) Between about 60 and about 40 weight percent of one or more crosslinked dispersion polymers, each of which is substantially insoluble in the organic solvent of the composition, said crosslinked dispersion polymer being formed by free radical polymerization of from about 1 to about 2.5 weight percent of di-, tri-, or tetracrylate monomers and 99 to 97.5 weight percent of at least one other copolymerizable, alpha-beta olefinically unsaturated monomer in the presence of (i) a hydrocarbon dispersing liquid which is a solvent for the polymerizable monomers, but a non-solvent for the resultant crosslinked polymer, and (ii) polymeric dispersion stabiliser which is solvated by said dispersing liquid and associated with said crosslinked polymer so as to maintain a separation between particles thereof, thereby inhibiting coagulation of said particles, wherein the polymerization is carried out at elevated temperature such that the dispersion polymer is first formed and then is crosslinked; and
   (B) an aminoplast crosslinking agent in an amount of between about 5 and about 40 parts per 100 parts of said binder composition.

14. A composition in accordance with claim 13 wherein said polymeric dispersion stabilizer contains at least two segments, one of which is solvated by said dispersing liquid and a second of which is of different polarity than said first segment and is relatively insoluble in said dispersing liquid.

15. A composition in accordance with claim 13 wherein said polymeric dispersion stabilizer is a butylated melamine.

* * * * *